(12) United States Patent
Pan

(10) Patent No.: US 6,222,584 B1
(45) Date of Patent: Apr. 24, 2001

(54) METHOD OF AUTOMATICALLY ROTATING IMAGE STORAGE DATA SUBJECT TO IMAGE CAPTURE ANGLE, AND THE RELATED DIGITAL CAMERA

(75) Inventor: Chih-Wen Pan, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 09/433,792

(22) Filed: Nov. 3, 1999

(51) Int. Cl.[7] .............................. H04N 5/76; H04N 5/225; G03B 9/20
(52) U.S. Cl. .......................... 348/231; 348/375; 396/500
(58) Field of Search ..................................... 348/231, 232; 396/500; 250/208.6, 206.2, 227.3; 356/139.3, 139.1, 141.2, 151

(56) References Cited

U.S. PATENT DOCUMENTS 5,710,572 * 1/1998 Nihei ...................................... 396/500

* cited by examiner

Primary Examiner—Wendy R. Garber
Assistant Examiner—Rashawn N. Tillery
(74) Attorney, Agent, or Firm—Bacon & Thomas, PLLC

(57) ABSTRACT

A digital camera, which includes an optical module for capturing an image, angle detecting sensor means for detecting the angle of the digital camera when capturing an image, and a photo processing module, which controls the operation of the optical module to adjust exposure, focusing, and field depth when capturing an image, converts captured image into a digital image signal, and rotates the picture frame of the digital image signal thus obtained into an image storage format subject to the camera angle detected by the angle detecting sensor means.

5 Claims, 5 Drawing Sheets

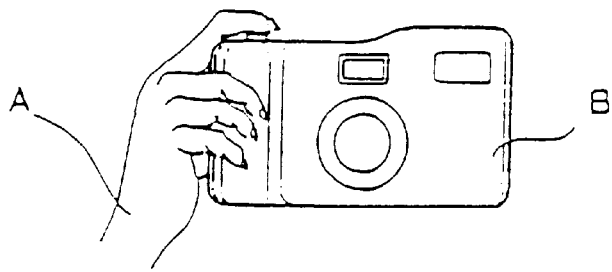
Fig. 1 (Prior Art)
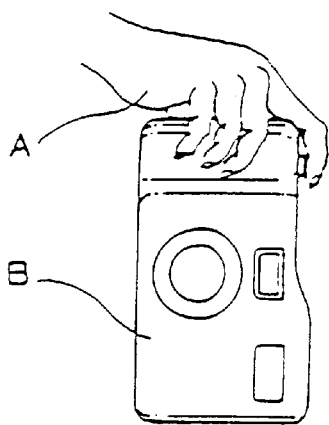
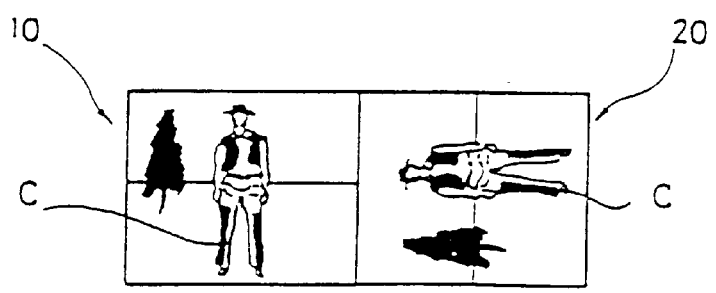
Fig. 2 (Prior Art)

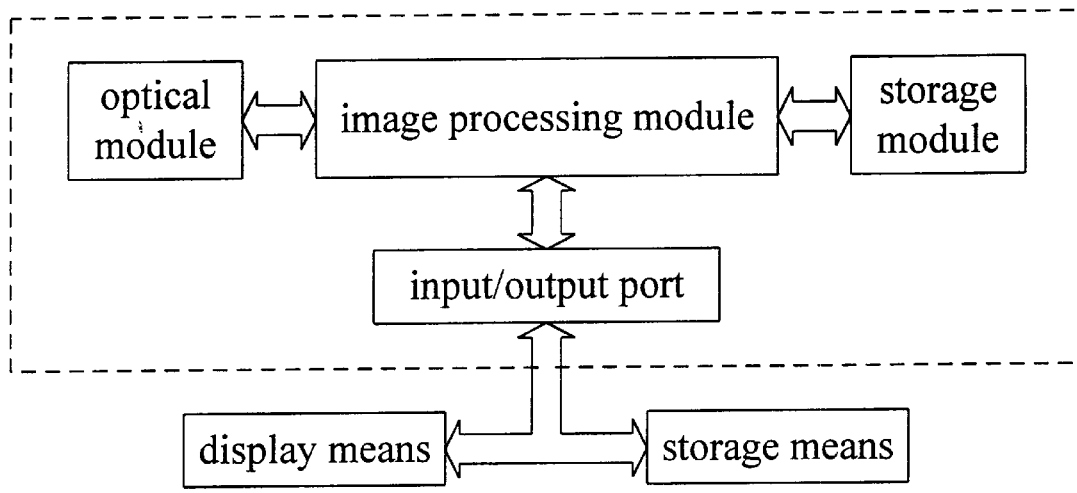
Fig. 3      (Prior Art)
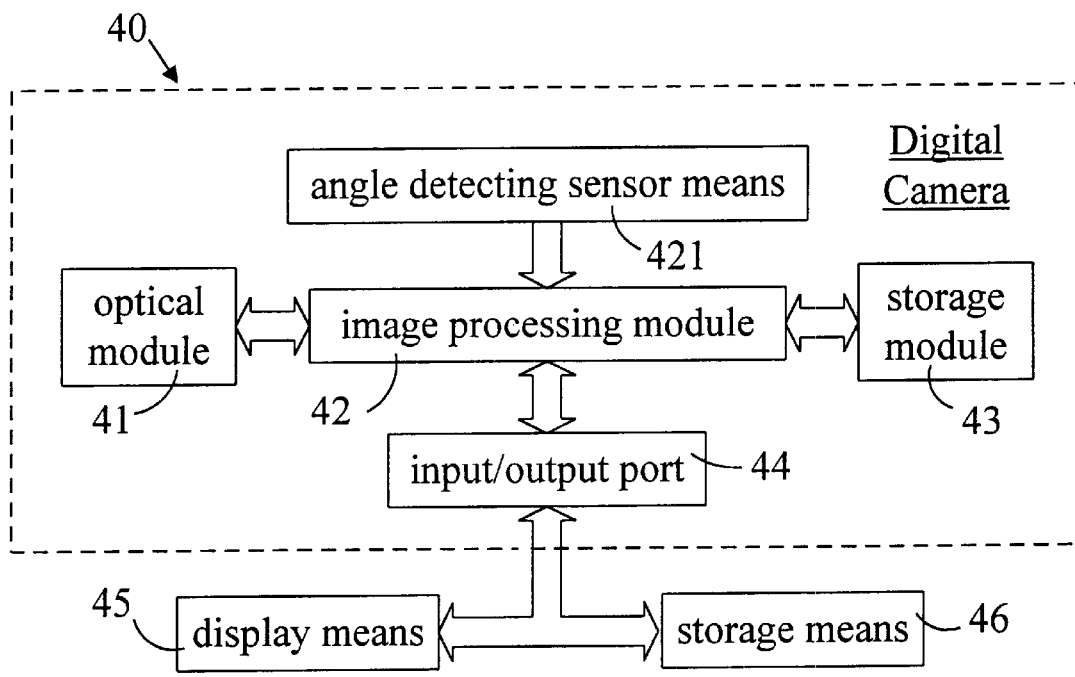
Fig. 4

METHOD OF AUTOMATICALLY ROTATING IMAGE STORAGE DATA SUBJECT TO IMAGE CAPTURE ANGLE, AND THE RELATED DIGITAL CAMERA

BACKGROUND OF THE INVENTION

The present invention relates to digital cameras, and more particularly to such a digital camera, which is capable of automatically rotating image storage data subject to image capture angle.

A variety of digital cameras have been developed, and have appeared on the market. These digital cameras are sold with an attached software package, so that the consumer can watch captured images through a personal computer or TV set, or edit the images in a personal computer. A regular digital camera 30, as shown in FIG. 3, is generally comprised of an optical module 31, an image processing module 32, a storage module 33, and an input/output port 34. The optical module 31 is comprised of at least one lens. The image processing module 32 controls the operation of the optical module 31 to adjust exposure, focusing, field depth when the digital camera picks up an image, processes captured image into an array of pixels subject to a predetermined format, and stores the array of pixels in the storage module 33 or sends the array of pixels to an external display (for example, a computer or TV set) 35 or storage means (for example, a hard disk drive) 36 through the input/output port 34. The use of a digital camera saves much cost in photo developing and photo storage arrangement. However, the picture frame of a digital image is stored in the position corresponding to the angular position of the digital camera when capturing the image. For example, if the user A holds the digital camera B horizontally when capturing an image as shown in FIG. 1, the object C in the picture frame 10 is presented at the normal vertical status. If the user A holds the digital camera B vertically when capturing up an image as shown in FIG. 2, the object C in the picture frame 20 is presented at a horizontal status. It is uncomfortable to watch a picture in which the object is not presented at the normal vertical status. When editing pictures in a personal computer, an erroneous visual judgment may occur, and the editing efficiency and effect will be affected.

SUMMARY OF THE INVENTION

The present invention has been accomplished under the circumstances in view. It is the main object of the present invention to provide a method of automatically rotating image storage data subject to image capture angle, so that the object in each picture is presented in the natural normal position comfortable for watching. It is another object of the present invention to provide a digital camera, which is capable of automatically rotating image storage data subject to image capture angle. According to one aspect of the present invention, angle detecting sensor means is installed in the digital camera detecting to detect the angle of the digital camera when capturing an image, enabling the image processing module of the digital camera to rotate the picture frame of the captured image to a predetermined image storage format. According to another aspect of the present invention, the picture frame of the captured image can be rotated through 90°, 180° or 270° angle subject to the angle of rotation of the digital camera.

BRIEF DESCRIPTION OF THE DRAWINGS

FIG. 1 is a schematic drawing showing the format of the picture frame of the image obtained from a digital camera held in a horizontal position.

FIG. 2 is a schematic drawing showing the format of the picture frame of the image obtained from a digital camera held in a vertical position.

FIG. 3 is a circuit block diagram showing the basic architecture of a digital camera according to the prior art.

FIG. 4 is a circuit block diagram showing the basic architecture of a digital camera according to the present invention.

DETAILED DESCRIPTION OF THE PREFERRED EMBODIMENT

Figure 5:
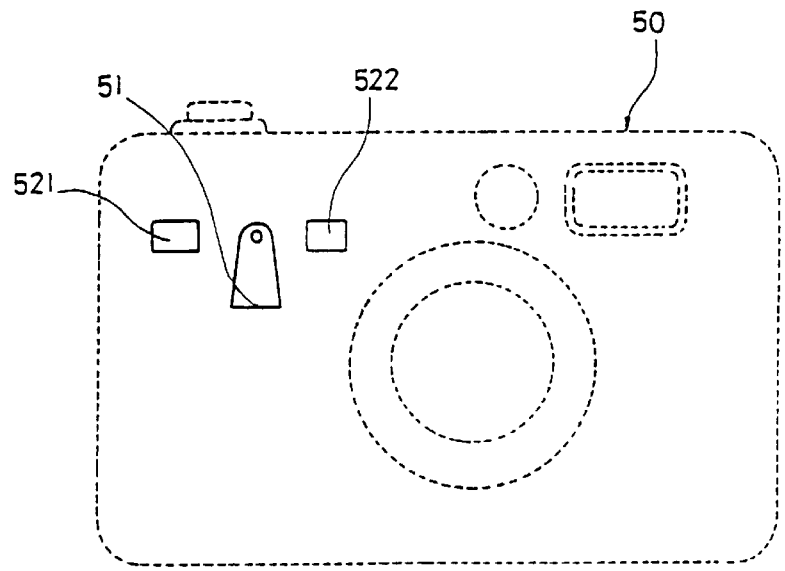
FIG. 5 is schematic drawing showing the position of the light chopper of the angle detecting sensor means in the digital camera held in the normal horizontal position according to the present invention.

Referring to FIG. 4, a digital camera 40 in accordance with the present invention comprises an optical module 41, an image processing module 42, a storage module 43, an input/output port 44, and angle detecting sensor means 421. The optical module 41 is comprised of at least one lens and image capture means such as charge-coupled device. The angle detecting sensor means 421 detects the angle (horizontal or vertical) of the digital camera 40 when capturing an image. The image processing module 42 controls the operation of the optical module 41 to adjust exposure, focusing, and field depth when capturing an image, converts captured image into a digital image signal, and rotates the picture frame of the digital image signal into a horizontal (or vertical) image storage format subject to the camera angle detected by the angle detecting sensor means 421, and stores the horizontal (or vertical) image storage format in the storage module 43 or sends the horizontal (or vertical) image storage format to an external display (for example, a computer or TV set) 45 or storage means (for example, a hard disk drive) 46 through the input/output port 44.

Figure 6:
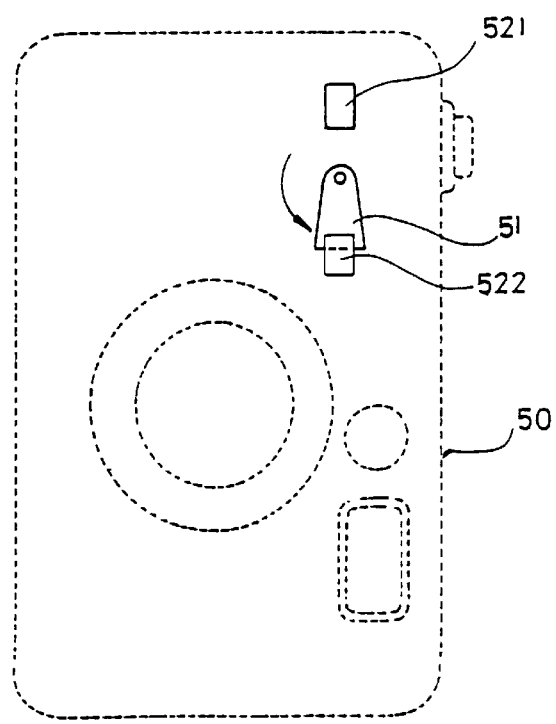
FIG. 6 illustrates the position of the light chopper of the angle detecting sensor means in the digital camera when the digital camera rotated clockwise through 90° angles according to the present invention.
Figure 7:
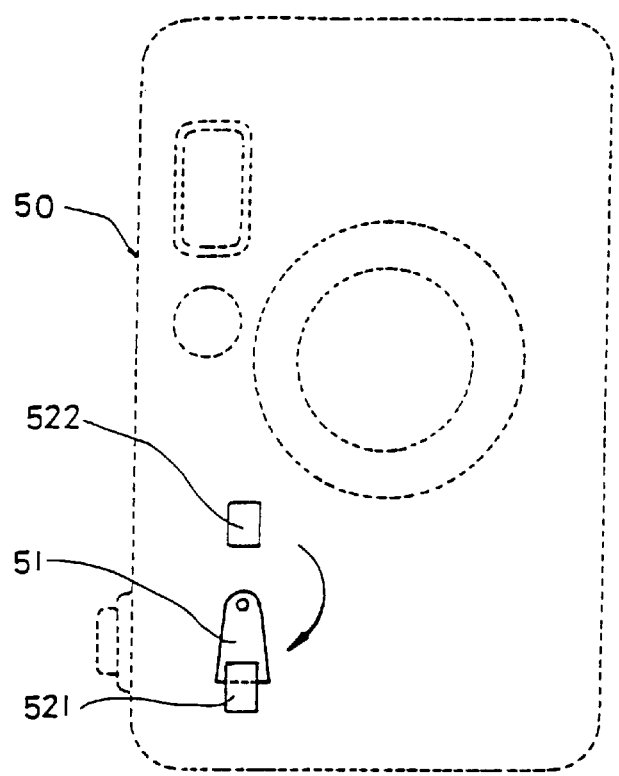
FIG. 7 illustrates the position of the light chopper of the angle detecting sensor means in the digital camera when the digital camera rotated counter-clockwise through 90° angles according to the present invention.

Referring to Figures from 5 through 7, an angle detecting sensor means is installed in a digital camera 50 at a suitable location, comprised of a light chopper 51 turned about a pivot at the digital camera 50, and two photo sensors 521 and 522 disposed at two opposite sides in the path of the light chopper 51. When the user holds the digital camera 50 horizontally to capture an image, the light chopper 51 does not block the photo sensors 521 and 522, and the picture frame of the picked image is in the normal position. When the user rotates the digital camera 50 in clockwise direction through 90° angle as shown in FIG. 6, the light chopper 51 blocks the second photo sensor 522, thereby causing the image processing module to automatically rotate the picture frame of the digital image signal thus obtained in counter-clockwise direction through 90° angle. If the user rotates the digital camera 50 in counter-clockwise direction through 90° angle as shown in FIG. 7, the light chopper 51 blocks the first photo sensor 521, thereby causing the image processing module to automatically rotate the picture frame of the digital image signal thus obtained in clockwise direction through 90° angle.

Figure 8:
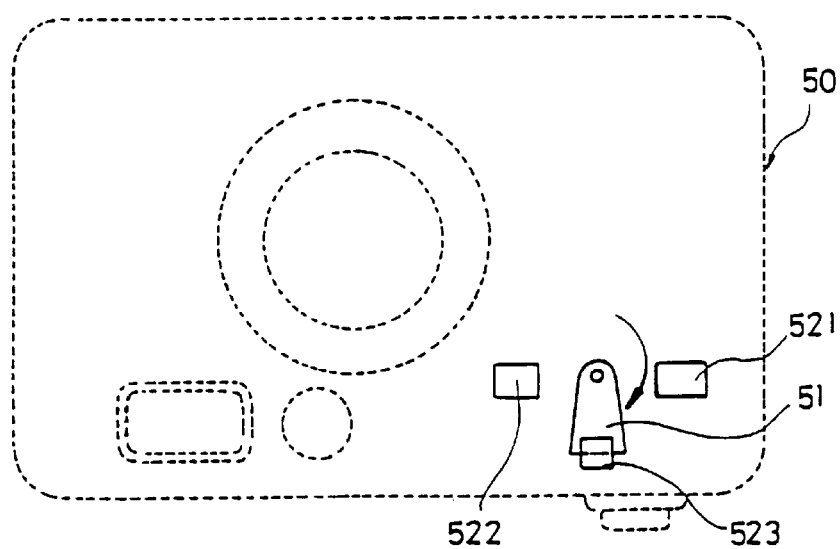
FIG. 8 illustrates the position of the light chopper of the angle detecting sensor means in the digital camera when the digital camera rotated through 180° angle according to the present invention.

The embodiment of the angle detecting sensor means shown in FIG. 8 comprises three photo sensors, namely, the first photo sensor 521 at the nine o'clock position, the second photo sensor 522 at the three o'clock position, and the third photo sensor 523 at the twelve o'clock position. When the user rotates the digital camera 50 in clockwise or counter-clockwise direction through 180° angle, the light chopper 51 blocks the third photo sensor 523, thereby causing the image-processing module to automatically rotate the picture frame of the digital image signal thus obtained through 180° angle.

Figure 9:
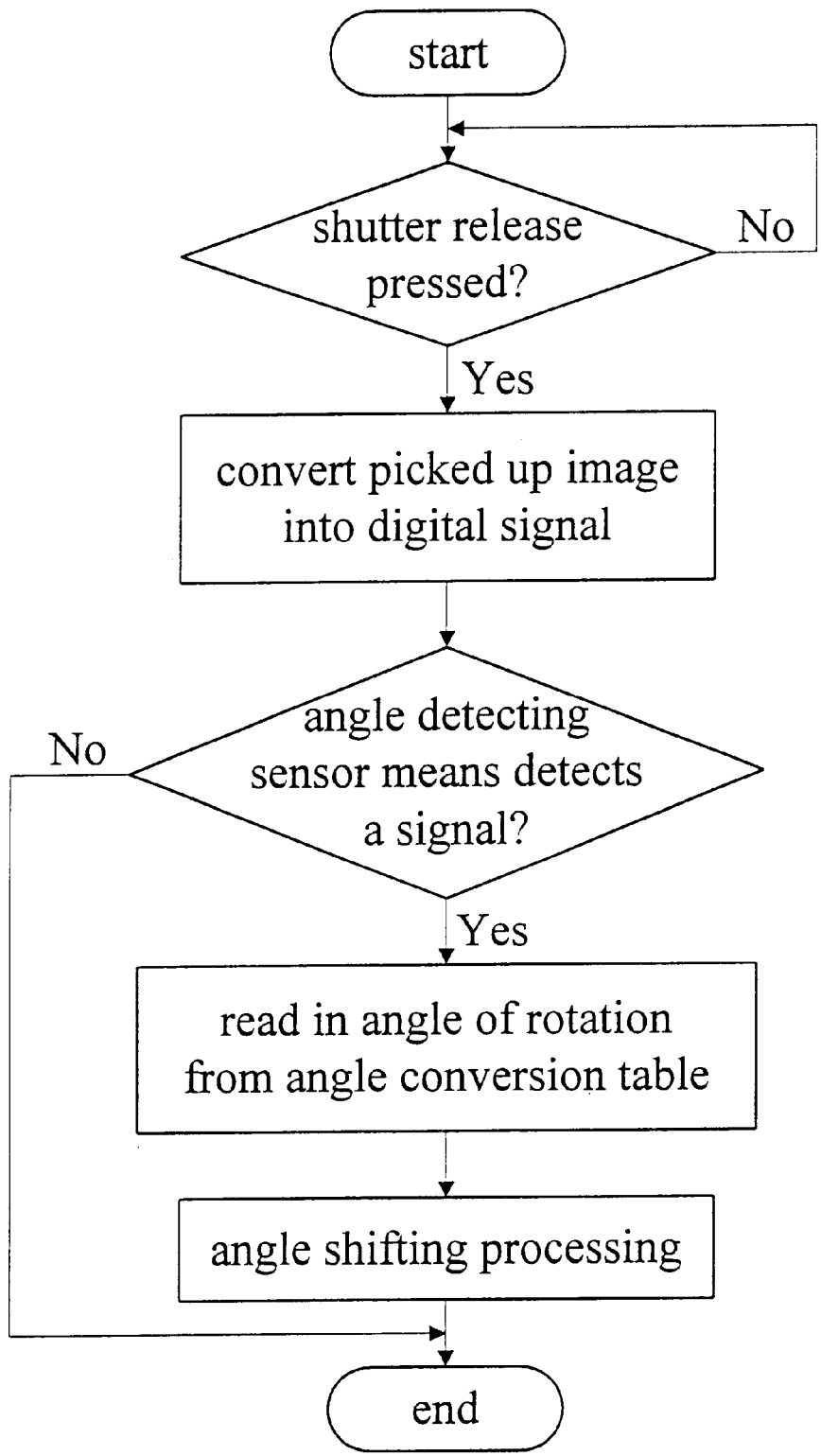
FIG. 9 is an image-processing module processing flow chart according to the present invention.

Referring to FIG. 9, when rotating the picture frame of the digital image signal, the image-processing module runs subject to the following procedure:

1. converting the image signal captured by the optical module into digital image signal subject to a predetermined format immediately after the shutter release has been pressed;
2. reading in the signal detected by the angle detecting sensor means;
3. reading in the angle of rotation from an angle conversion table subject to the signal obtained from the angle detecting sensor means; and
4. shifting the picture frame of the digital image signal to the desired status subject to the angle of rotation obtained.

As indicated above, if the user rotates the digital camera through 90°, 180° or 270° angle when capturing an image, the image processing module can automatically rotate the picture frame of the digital image signal thus obtained through an angle subject to the angle signal detected by the angle detecting sensor means, enabling the digital image signal to be converted into the desired horizontal or vertical image storage format convenient for graphic editing.

It is to be understood that the drawings are designed for purposes of illustration only, and are not intended for use as a definition of the limits and scope of the invention disclosed.

What the invention claimed is:

1. A digital camera comprising:

an optical module, said optical module comprising at least one lens means and image capture means;

angle detecting sensor means, which detects the angle of the digital camera when capturing an image; and an image processing module, which controls the operation of said optical module to adjust exposure, focusing, and field depth when capturing an image, converts the captured image into a digital image signal, and rotates the picture frame of the digital image signal thus obtained into an image storage format subject to the camera angle detected by said angle detecting sensor means, wherein said angle detecting sensor means comprises a light chopper pivoted to the digital camera and turned about an axis along a circular path, and at least one photo sensor installed in said circular path.

2. The digital camera of claim 1 further comprising a storage module for storing said image storage format.

3. The digital camera of claim 1 further comprising an input/output port for enabling said image storage format to be outputted to an external display or storage means.

4. The digital camera of claim 1 wherein said at least one photo sensor includes two photo sensors horizontally aligned at two opposite sides relative to said light chopper.

5. The digital camera of claim 1 wherein said at least one photo sensor includes three photo sensors disposed in said circular path at the nine o'clock position, the three o'clock position and the twelve o'clock position respectively.

* * * * *